Feb. 5, 1929.  
E. L. DENNIS  
1,701,404  
HYDROMETER  
Filed Jan. 30, 1928   3 Sheets-Sheet 2

Inventor  
Edwin L. Dennis  
by Wilkinson & Giusta  
Attorneys.

Feb. 5, 1929.   E. L. DENNIS   1,701,404
HYDROMETER
Filed Jan. 30, 1928   3 Sheets-Sheet 3
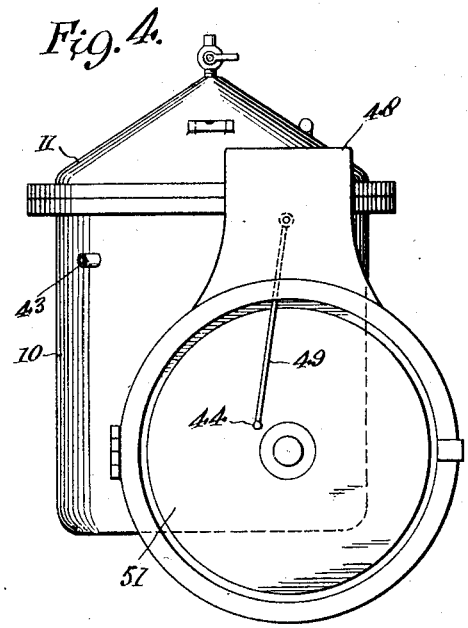
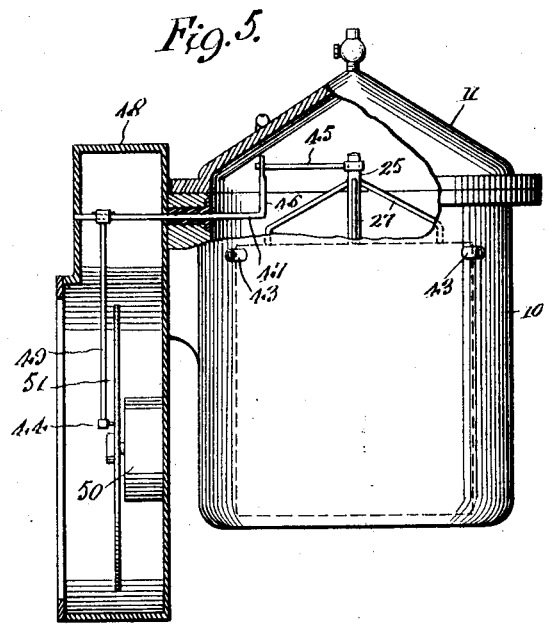
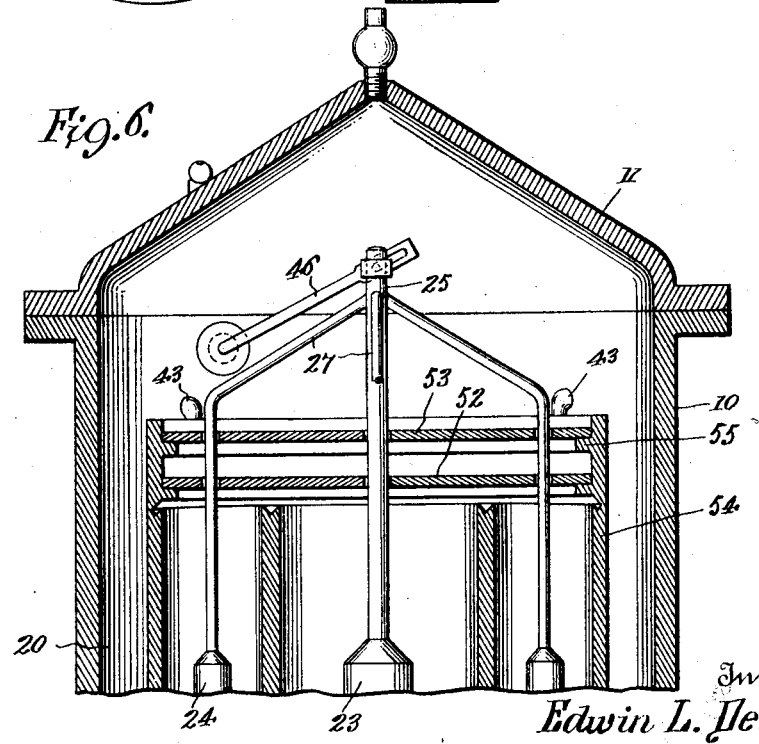
Inventor
Edwin L. Dennis
by Wilkinson & Giusta
Attorneys.

Patented Feb. 5, 1929.

1,701,404

UNITED STATES PATENT OFFICE.

EDWIN L. DENNIS, OF RESERVE, LOUISIANA.

HYDROMETER.

Application filed January 30, 1928. Serial No. 250,544.

The present invention relates to recording instruments, and more particularly to a hydrometer for determining the specific gravity and other information with respect to water or other fluid with which the instrument may be used.

An object of this invention is to record the specific gravity or the like for determining the density of liquids while the same are in continuous flow or motion, so that it is unnecessary to entrap or test the liquid in separate bodies, and wherein the condition of the liquid may be continuously recorded during its flow.

Another object of the present invention is to provide a structure wherein the friction and impact of the current against the floats of the hydrometer is counterbalanced or negatived, so that the pressure and friction incident to the stream or flow of the liquid will not affect the reading and recording of the instrument.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical central section taken through a hydrometer constructed according to the present invention;

Figure 4 is a side elevation of a modified form of the invention wherein a disc record may be used;

Figure 5 is a fragmentary section taken at right angles to the showing in Figure 4, and Figure 6 is an enlarged section taken through the fluid chamber showing the connection between the floats and the recording arm.

Figure 1:
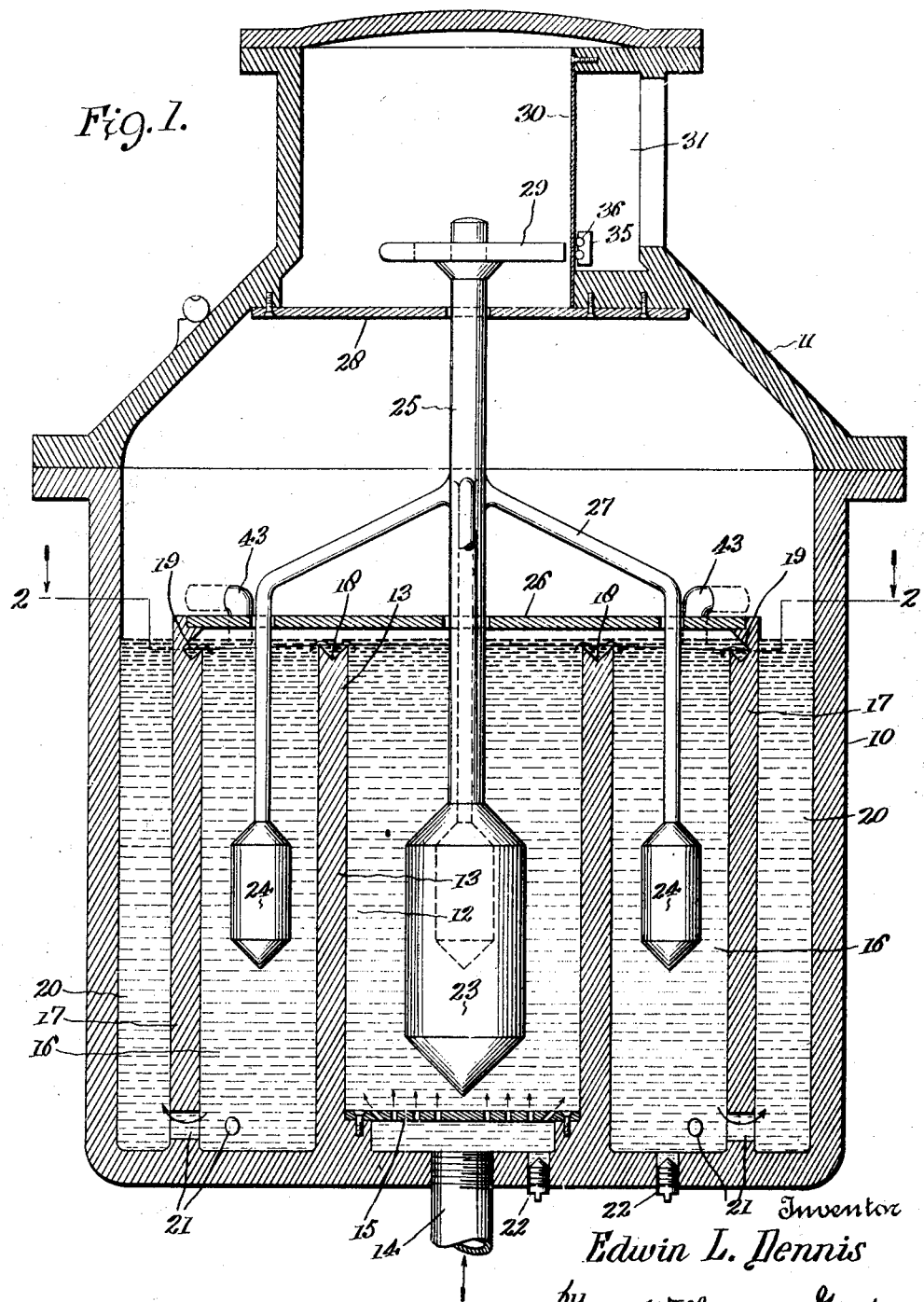

Referring to the drawings, and first to the form shown in Figs. 1, 2 and 3, 10 designates a casing of metal or other suitable material, which is provided with a hood 11 adapted to close and seal the casing 10, and which preferably converges upwardly for supporting the recording mechanism and housing the connections between the same and the instruments mounted in the casing 10.

The casing 10 is provided with a co-axial inlet chamber 12 defined by an annular wall 13, and the casing 10 has in its bottom an inlet pipe 14 upwardly through which liquid to be measured is led into the lower end of the chamber 12. A distribution disc 15 is seated within the wall 13 at the lower end of the chamber 12 and is spaced slightly above the pipe 14, so that liquid from the pipe may spread beneath the disc 15 and pass upwardly in divided streams through the perforations in the distribution disc 15. The disc 15 thus breaks up the stream or current, which would be produced axially and centrally of the chamber 12, and causes an even upward movement of the liquid through the chamber throughout the entire cross-sectional area of the same.

Arranged concentric about the chamber 12 are a number of down-flow chambers 16, preferably four in number, and of such diameter that the combined cross-sectional areas of the chambers 16 are equal to the cross-sectional area of the chamber 12. The annular wall 13 forms a partition or dam between the central up-flow and concentric down-flow chambers and over the upper edge of which the liquid is adapted to flow from the up-flow chamber 12 into the down-flow chambers 16.

Figure 2:
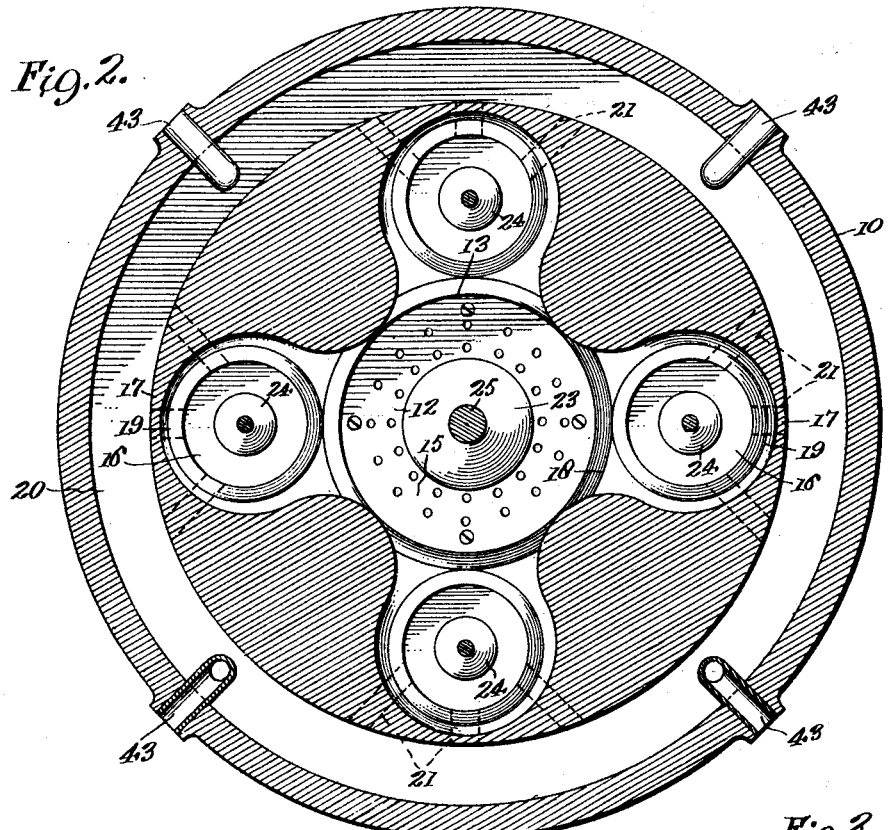
Figure 2 is a horizontal section taken through the same substantially on the line 2—2 of Figure 1.

The down-flow chambers 16 are defined by cylindrical walls 17, which merge at their inner sides into the wall 13 and which may be, as shown in Figure 2, of solid construction between the down-flow chambers 16. The upper edge of the wall 13 is provided with a substantially annular groove 18, forming distributing means for the liquid, which overflows from the up-flow chamber 12, so that the liquid will not overflow from any one side or point, but will flow evenly over the wall 13 and in equal amounts into the respective down-flow chambers 16. The groove 18 of the up-flow chamber 12 merges into a similarly formed groove 19 in each of the down-flow chambers 16, so that the overflow liquid will be evenly distributed about the wall 17 and will thus flow into the chambers 16 from all sides thereof, and the downwardly flowing stream of liquid in the chambers 16 will move throughout the entire cross-sectional area of the chambers 16. The provision of these grooves 18 and 19 thus prevent jet formations in the stream and distribute the stream pressure throughout the entire widths of the respective chambers. The walls 17 of the down-flow chambers 16 are spaced from the outer wall of the casing 10, so as to provide a take-off chamber 20, which communicates with the chambers 16 through passages 21, which are formed through the lower portions of the walls 17. Clean-out plugs 22 may be mounted in the bottom of the casing 10 in register with the respective chambers.

The central up-flow chamber 12 is provided with a float 23, which is relatively large, and each chamber 16 is provided with a float 24. The combined displacement of the small floats 24 is equal to the displacement of the large float 23, so that the pressure of the upwardly flowing liquid in the large chamber 12 against the large float 23 is offset by the pressure of the downwardly flowing liquid in the down-flow chambers 16 against the floats 24. The float 23 has a stem 25, which extends upwardly from the chamber 12 and through a guide plate 26, which is secured over the chambers. Spider arms 27 are carried by the stem 25 and extend radially and downwardly for supporting the floats 24 and connecting them to the stem 25. The upper end of the stem 25 passes through a second guide plate 28, which is secured in the cover 11, and the stem carries a permanent magnet 29, which is mounted horizontally on the upper end of the stem and in proximity to a non-magnetic plate 30, which is secured in the top of the cover 11 across one side thereof, as shown in Fig. 1.

Figure 3:
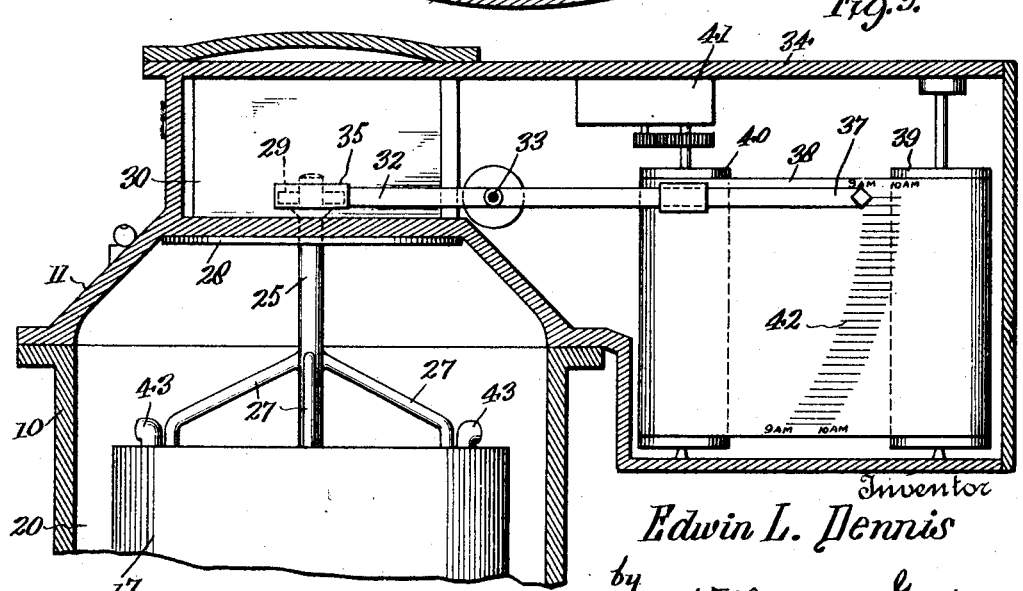
Figure 3 is a fragmentary upper end section taken through the hydrometer at right angles to the showing in Figure 1, and illustrating the recording mechanism.

The plate 30 is inset with respect to the adjacent side of the cap to provide a compartment 31 for a recording arm 32. The arm 32 is pivotally mounted at 33 within a compartment 34 mounted upon one side of the cover 11. The arm 32 projects into the compartment 31 and carries an armature 35 upon its inner end adapted to register with the magnet 29, but remote therefrom with respect to the plate 30. The armature 35 is provided with rollers 36, which engage the plate 30 to reduce the frictional contact between the armature and the plate under the influence of the magnet and to facilitate the movement of the armature in following the rise and fall of the magnet during variations in density of the liquid. The outer end of the recording arm 32 is provided with a marking point 37 arranged to traverse a web 38 mounted on rollers 39 and 40, the latter being continuously driven by a motor 41, as shown in Fig. 3. The web 38 is provided with suitable indicia and graduations 42 adapted to be traversed by the marking point 37 for drawing a line upon the web 38 incident not only to the movement of the web 38, but also to the swinging of the arm 32.

In operation, the liquid enters the pipe 14, is distributed in the bottom of the chamber 12 and flows upwardly therethrough, tending to raise the float 23. From the top of the chamber 12, the liquid flows over into the down-flow chambers 16 and is evenly distributed to the chambers and also through the same and flows downwardly tending to force the floats 24 downwardly. This latter action offsets the tendency to elevate the float 23, so that the floats assume a position dependent upon the density or specific gravity of the liquid, which is passing through the chambers.

The liquid is carried out of the down-flow chambers 16 through the openings 21 into the take-off chamber 20, and the liquid may be removed from the chamber 20 by pipes 43 or the like, suitably placed through the outer wall of the casing 10, and which may be connected to a suitable suction device for drawing the liquid through the instrument.

As shown in Figs. 1 and 3, the mechanism is adjusted for use with a liquid of predetermined low density. Upon variation in the density of the liquid, the floats 23 and 24 rise and elevate the magnet 29, which causes the armature 35 to move upwardly therewith, swinging the recording arm 32 in a direction to move the marking point 37 downwardly over the web 38. The relative changes in density are thus continuously recorded as the liquid flows through the instrument.

A slight modification in the recording mechanism is shown in Figs. 4, 5, and 6. In this form the magnet is not used and a direct mechanical connection is made between the marking point 44 and the stem 25 of the floats. The stem 25 carries a pin 45, projecting laterally from the upper end thereof and operable in a slotted arm 46, which is carried on the inner end of a shaft 47. The shaft 47 is journalled through one side of the casing 10 and projects into the housing 48, in which the recording apparatus is positioned. The shaft 47 carries a recording arm 49, which extends downwardly in the casing 48 and upon which the marking point 44 is mounted. A motor 50 is disposed in the casing 48 and carries a recording disc 51 over which the point 44 moves. As the stem 25 rises and falls, it rocks the shaft 47 and swings the arm 49 radially with respect to the disc 51, so as to move the point 44 across the disc, as the latter is rotated.

In order to steady the stem 25, when the mechanical connection is used, a pair of guide plates 52 and 53 are employed and are mounted upon the outer walls 54 of the down-flow chambers, the walls being extended upwardly and provided with beads or flanges 55 spaced vertically apart to support the guide plates 52 and 53.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:

1. An hydrometer comprising a casing, a plurality of chambers mounted in the casing and connected in series, means for conducting a liquid through said chambers with the liquid traveling in one chamber in one direction and in an adjacent chamber in an opposite direction, a float in each chamber, means for connecting said floats together, and recording means connected to the floats for recording variations in the positions of the floats in said chambers.

2. An hydrometer comprising a casing having an up-flow chamber and a plurality of down-flow chambers arranged about the up-flow chamber, means for admitting liquid into the bottom of the up-flow chamber, said liquid adapted to overflow from the up-flow chamber into the down-flow chambers, means for evenly distributing the flow from the up-flow chamber into the down-flow chambers, a float in the up-flow chamber, a float in each down-flow chamber, means for rigidly connecting said floats together to rise and fall as a unit, means for carrying off liquid from the lower ends of said down-flow chambers, the float of said up-flow chamber having a displacement equal to the combined displacement of the floats in the down-flow chambers for balancing the up and down current flow pressures in the up-flow and down-flow chambers, and recording means connected to the floats.

3. An hydrometer comprising a casing having an up-flow chamber, and a purality of down-flow chambers communicating with the upper end of the up-flow chamber, means for admitting liquid to the lower end of the up-flow chamber, means for withdrawing liquid from the lower ends of the down-flow chambers, means for distributing the incoming liquid throughout the cross sectional area of the up-flow chamber, means for distributing the overflow liquid from the up-flow chamber equally to the down-flow chambers and throughout the cross sectional areas thereof, a float in each chamber, the floats in the down-flow chambers having a combined displacement equal to the displacement of the float in the up-flow chamber, means for rigidly connecting said floats together, and recording means connected to said float connecting means.

4. An hydrometer comprising a casing, an annular wall arranged concentrically within the casing to provide a central chamber, means for admitting liquid to the bottom of said central chamber, a plurality of annular walls arranged concentrically about the first annular wall to provide lateral chambers, the upper edges of said walls having annular grooves therein for uniformly distributing liquid from the upper end of the central chamber into the lateral chamber and for distributing the liquid evenly into the upper ends of the lateral chambers, a stem structure mounted for a vertical sliding movement in the casing, floats fixed upon the stem structure one for each chamber, the floats of the lateral chambers having a combined displacement equal to the displacement of the float in the central chamber, means for withdrawing liquid from the lower ends of the lateral chamber, and recording means connected to the stem structure for recording the vertical movements thereof.

5. An hydrometer comprising a casing having a plurality of chambers therein, means for conducting liquid in series up and down through the chambers, floats in the chambers, a stem structure connected to said floats for equalizing the up and down current pressure of the liquid against the floats, a magnet mounted on the upper end of the stem structure, a recording arm carried by the casing, an armature on said arm arranged in the field of said magnet and adapted to be raised and lowered by movements of the magnet, and recording means adapted to be traversed by said recording arm for making a record of movements of said stem structure.

6. An hydrometer comprising a casing having vertical chambers therein connected together in series, means for conducting liquid through the chambers in up and down streams, a float in each chamber, a stem structure connected to said floats, a magnet carried by the stem, a partition plate of non-magnetic material mounted in the casing adjacent to the magnet to provide a compartment remote therefrom, a recording arm pivotally mounted upon the casing and extending into said compartment, and an armature mounted on the recording arm and having antifriction means engaging said plate adapted for movement vertically against the plate under the influence of the magnet for swinging the recording arm.

7. An hydrometer comprising a casing having a plurality of chambers therein, means for conducting liquid in up and down streams through the chambers, floats in the chambers, a stem structure connected to the floats, recording means disposed adjacent to the casing and having a recording arm, and means operable by the rise and fall of the stem structure, for swinging the recording arm.

EDWIN L. DENNIS.